United States Patent
Hirschel et al.

(10) Patent No.: US 12,392,062 B2
(45) Date of Patent: Aug. 19, 2025

(54) METHOD FOR PRODUCING NOBLE METAL MESHES ON FLATBED KNITTING MACHINES

(71) Applicant: HERAEUS PRECIOUS METALS GMBH & CO. KG, Hanau (DE)

(72) Inventors: Pascal Hirschel, Hanau (DE); Hendrik Spod, Hanau (DE); Verena Wald, Hanau (DE)

(73) Assignee: HERAEUS PRECIOUS METALS GMBH & CO. KG, Hanau (DE)

( * ) Notice: Subject to any disclaimer, the term of this patent is extended or adjusted under 35 U.S.C. 154(b) by 0 days.

(21) Appl. No.: 18/730,660

(22) PCT Filed: Nov. 1, 2022

(86) PCT No.: PCT/EP2022/080424
§ 371 (c)(1),
(2) Date: Jul. 19, 2024

(87) PCT Pub. No.: WO2023/138805
PCT Pub. Date: Jul. 27, 2023

(65) Prior Publication Data
US 2025/0137174 A1    May 1, 2025

(30) Foreign Application Priority Data

Jan. 24, 2022 (EP) .................... 22152843

(51) Int. Cl.
*D04B 1/10* (2006.01)
*B01J 23/46* (2006.01)
(Continued)

(52) U.S. Cl.
CPC ............ *D04B 1/104* (2013.01); *B01J 23/464* (2013.01); *B01J 35/58* (2024.01); *C22C 5/04* (2013.01);
(Continued)

(58) Field of Classification Search
CPC .............. D04B 1/10; D04B 1/12; D04B 1/14; D04B 1/16; D04B 1/22; D04B 1/104;
(Continued)

(56) References Cited

U.S. PATENT DOCUMENTS

| 2,274,684 | A | * | 3/1942 | Goodloe | ................ D04B 21/14 55/525 |
| 5,268,157 | A | * | 12/1993 | Blass | .................... C01B 21/267 423/403 |

(Continued)

FOREIGN PATENT DOCUMENTS

| EP | 0364153 | B1 | 3/1992 |
| EP | 0544710 | A1 | 6/1993 |
| EP | 0680787 | A1 | 11/1995 |
| EP | 1358010 | B2 | 7/2008 |
| EP | 3779005 | A1 | 2/2021 |
| EP | 3795728 | A1 | 3/2021 |

*Primary Examiner* — Danny Worrell
(74) *Attorney, Agent, or Firm* — Blank Rome LLP

(57) ABSTRACT

A method for producing a two-layer noble metal mesh on a flatbed knitting machine which has a first and a second needle bed. The method comprises: providing at least one wire containing noble metal; and knitting the noble metal mesh. The first and second layers of the noble metal mesh are knitted simultaneously on the first and second needle beds, these two parts being at least in part connected at their two abutting edges by connecting stitches.

10 Claims, 2 Drawing Sheets

Figure 1:
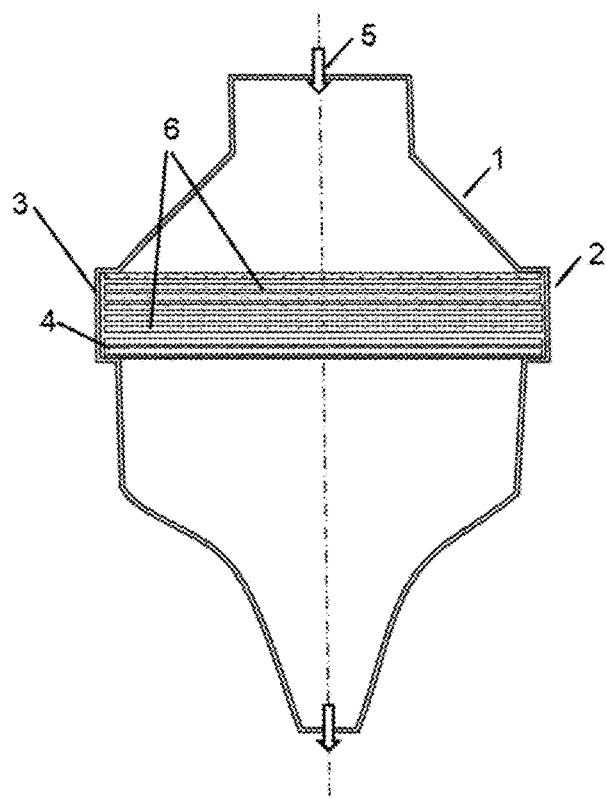

(51) Int. Cl.
*B01J 35/58* (2024.01)
*C22C 5/04* (2006.01)
*D04B 1/14* (2006.01)
*D04B 1/22* (2006.01)

(52) U.S. Cl.
CPC ............ *D04B 1/14* (2013.01); *D04B 1/22* (2013.01); *D10B 2101/20* (2013.01); *D10B 2505/00* (2013.01)

(58) Field of Classification Search
CPC ..... D04B 7/12; D04B 7/14; D04B 7/30; B01J 35/58; D10B 2101/20
See application file for complete search history.

(56) References Cited

U.S. PATENT DOCUMENTS

| | | | | |
|---|---|---|---|---|
| 6,073,467 | A * | 6/2000 | Blass | B01J 35/58 66/196 |
| 6,089,051 | A * | 7/2000 | Gorywoda | D04B 21/12 66/170 |
| 10,258,966 | B2 * | 4/2019 | Born | B01J 35/58 |
| 11,242,628 | B2 * | 2/2022 | Mueller | D04B 1/22 |
| 11,959,208 | B2 * | 4/2024 | Born | B01J 35/58 |
| 2022/0323947 | A1 * | 10/2022 | Born | B01J 23/42 |
| 2023/0226534 | A1 * | 7/2023 | Born | B01J 23/464 423/403 |
| 2023/0321644 | A1 * | 10/2023 | Kopatsch | C01C 3/0216 502/325 |
| 2023/0398531 | A1 * | 12/2023 | Born | C01B 21/265 |
| 2023/0415139 | A1 * | 12/2023 | Born | C01B 21/265 |

* cited by examiner

METHOD FOR PRODUCING NOBLE METAL MESHES ON FLATBED KNITTING MACHINES

The present invention relates to a method for producing a two-layer noble metal mesh on a flatbed knitting machine which comprises a first and a second needle bed. The method comprises providing at least one noble-metal-containing wire and knitting the noble metal mesh. The first and second layers of the noble metal mesh are knitted simultaneously on the first and second needle beds and these two parts are at connected, at least in part, at their two respective abutting edges thereof.

The heterogeneous noble-metal-catalyzed oxidation of ammonia ($NH_3$) to nitric acid ($HNO_3$, Ostwald process) or production of hydrogen cyanide (HCN, Andrussow process) is of great importance due to the central relevance of the products for the chemical industry. The catalyst systems used for this purpose are typically, in the form of gas-permeable fabrics, incorporated into the reaction zone of a flow reactor in a plane perpendicular to the flow direction of the fresh gas. Collecting or catchment systems for recovering evaporated catalytically active components are also frequently based on such mesh-like structures. Usually, a plurality of meshes are expediently arranged one behind the other and combined to form a catalyst mesh stack. The individual networks consist of fine noble metal wires which predominantly contain platinum (Pt), palladium (Pd), rhodium (Rh) or alloys of these metals. In particular, catchment meshes may also contain further constituents, for example nickel.

A number of methods for producing such knitted goods are known, for example weaving, warp-knitting and weft-knitting. Weaving and warp-knitting are particularly suitable for the production of rectangular mesh webs which have a homogeneous material distribution and structure. They offer little flexibility in terms of the shape and material variability of the products to be manufactured. In an additional method step, the meshes have to be cut, from the manufactured webs, to a size and shape suitable for the reactors, resulting in offcuts containing noble metal components. In addition, the machines used require long set-up times and a high material input.

In comparison, weft-knitting offers greater flexibility: the knitting patterns, wires (e.g., in terms of thickness and material), needles and tension of the wire can be used to vary both the weight per unit area as well as the structure, elasticity and strength of the obtainable knitted fabrics. Another advantage is the significantly shorter machine set-up times. It is also possible to use different materials in one knitted fabric; in so-called intarsia knitting, for example, different regions are made from different yarns or wires. In principle, the length of a knitted fabric is not limited, but, in the case of flat-bed knitting machines, the maximum width is determined by the width of the needle beds.

Flat-bed knitting machines or circular knitting machines can be used for knitting. In circular knitting machines, the needles are arranged in a circular needle bed and the thread or wire is supplied in a circular motion. These machines are primarily used for the production of tubular knitted goods. On flat-bed knitting machines, however, the shape and size of the knitted fabric can be varied. The latter can also comprise more than one needle bed, between which the yarn or wire is guided back and forth during production by means of thread guides.

The use of two needle beds allows a single-layer or two-layer knitted fabric to be produced. In principle, a single-layer knitted fabric can be created in two ways: in one, only one needle bed is worked on, i.e., only stitches are formed on one of the needle beds and knitted together. In the other, stitches created on the first needle bed can be knitted with stitches created on the second needle bed, i.e., the thread is guided back and forth between the two needle beds within a right and/or wrong side row. Accordingly, a two-layer knitted fabric is created when knitting is done in parallel on both needle beds and the stitches created on the first needle row are not knitted or only selectively knitted with the stitches created on the second needle bed via the edge stitches. With this production method, two single-layer knitted fabrics or layers can thus also be produced in parallel on the first and second needle bed.

The knitting of noble metal meshes is described in EP 0544710 A1. EP 3795728 A1 uses flat-bed knitting machines for this purpose. It is described that separate layers, produced on different needle beds, can be interconnected by means of a connecting row of stitches on one side of the two knitting surfaces. This allows knitted fabric surfaces to be produced that have larger widths than was previously possible.

However, it has been shown that such a one-sided connection can lead to warping of the knitted fabric and thus to instabilities in the production process. Such instabilities can manifest themselves in breaks in the wire during the knitting process and in irregularities in terms of structure and mechanical properties, which can result in a product of poor quality.

The problem addressed by the present invention was therefore to provide a method with a high process stability for producing noble metal meshes on flat-bed knitting machines.

The problem is solved by a method for producing a two-layer noble metal mesh on a flat-bed knitting machine, the flat-bed knitting machine comprising a first and a second needle bed, the method comprising the steps of
  providing at least one noble-metal-containing wire,
  knitting the noble metal mesh,
  the first layer of the noble metal mesh being knitted on the first needle bed and the second layer of the noble metal mesh being knitted on the second needle bed at the same time,
  the two layers each comprising at least two abutting edges,
  characterized in that the first and the second layer of the noble metal mesh are connected, at least in part, at their two respective abutting edges thereof, by at least one connecting knit stitch.

Within the scope of the invention, it was found that the stability of the knitting process can be increased by at least partially connecting both sides of knitted fabric parts made of noble metal wires on different needle beds. This results in dimensionally stable knitted fabrics that at least partially have an open tubular structure. By stabilizing the knitting process, the full combined width of the two needle beds of a flat-bed knitting machine can also be utilized.

The method according to the invention relates to knitting on a flat-bed knitting machine comprising a first and a second needle bed.

Knitting is characterized by the row-by-row production of the resulting knitted fabrics, in which process interlocking stitches are formed. During the knitting process on a flat-bed knitting machine comprising two needle beds, a knitting row is first formed on at least one of the needle beds. The next knitting row is then formed in the knitting direction, with the part of the knitted fabric that contains the first knitting row being referred to in the following as the "bottom." The thread or wire is guided from one side of the needle bed or needle beds to the other side and back. If reference is made in the following to a "thread", the relevant comment is also intended to apply to a corresponding "wire." A knitting row therefore comprises a right side row and a wrong side row, which results from the thread guide. The thread can in this case be guided over just one or both needle beds in a knitting row. Typically, the thread for a complete knitting row can first be guided on the first needle bed (right side row), and then the thread is guided in the opposite direction on the same needle bed or the second needle bed (wrong side row).

However, the thread can also be guided alternately on both needle beds in a right side and/or wrong side row, with connections being created between stitches on the two needle beds within one knitting row. The thread can be guided across the entire width of the needle bed or needle beds, but it is also possible to only knit across parts of the width of the needle beds. Depending on the width of the needle beds used for knitting, the width and also the shape of the knitted fabric can be determined.

The method comprises providing at least one noble-metal-containing wire.

A noble-metal-containing wire is understood to mean a wire which consists of at least one noble metal or contains a significant proportion (>50 wt. %) of noble metal. In the context of the present invention, noble metals are understood to mean a metal selected from the group consisting of platinum metals, gold and silver. Platinum metals are understood to mean the metals of the so-called platinum group, i.e., platinum (Pt), palladium (Pd), iridium (Ir), rhodium (Rh), osmium (Os) and ruthenium (Ru).

The at least one noble-metal-containing wire preferably consists of platinum, a platinum alloy, palladium, or a palladium alloy. A platinum-based alloy contains more than 50 wt. % platinum, and other alloy components include in particular palladium, rhodium and ruthenium. A palladium-based alloy contains more than 50 wt. % palladium.

Preferably, the at least one noble-metal-containing wire consists of an alloy selected from the group consisting of platinum with 1-15 wt. % rhodium, platinum with 1-15 wt. % rhodium and 0.1-20 wt. % palladium, platinum with 1-15 wt. % rhodium, 0.1-20 wt. % palladium and 0.1-5 wt. % ruthenium, platinum with 1-15 wt. % rhodium, 0.1-40 wt. % palladium and 0.001-5 wt. % iridium, platinum with 1-15 wt. % rhodium, 0.1-20 wt. % palladium and 0.001-5 wt. % tantalum, platinum with 1-15 wt. % rhodium, 0.001-5 wt. % iridium and 0.001-5 wt. % tantalum, palladium with 1-25 wt. % platinum, palladium with 1-20 wt. % platinum and 1-15 wt. % rhodium, palladium with 1-25 wt. % tungsten, palladium with 1-15 wt. % nickel, palladium with 0.001-5 wt. % rhodium, palladium with 1-15 wt. % copper, palladium with 1-15 wt. % copper and 1-15 wt. % nickel, and palladium with 1-30 wt. % cobalt.

Preferably, noble-metal-containing wires that have a diameter of 40-150 μm, preferably 50-130 μm, are used.

The at least one noble-metal-containing wire can be designed as a round wire, i.e., having a round cross section. In another embodiment, the wire can be designed as a flattened round wire or as a wire having a different cross section.

The at least one noble-metal-containing wire can comprise a plurality of wires, in this case also referred to as filaments, which can preferably be twisted together. The filaments can all consist of the same material, i.e., all containing noble metal, or consist of different materials, which in turn do not have to all contain noble metal.

In many cases, it can be advantageous to knit two or more noble-metal-containing wires together. In other words, when forming a stitch, a plurality of noble-metal-containing wires can be guided together. When knitting with a plurality of wires, in one embodiment the noble-metal-containing wires consist of the same material, and in further embodiments noble-metal-containing wires consisting of at least two different materials can be used. The plurality of wires can have the same or different diameters.

In the method according to the invention, a first layer of the two-layer noble metal mesh is knitted on the first needle bed and a second layer of the two-layer noble metal mesh is knitted on the second needle bed at the same time. In other words, during the knitting process, two parts of the two-layer noble metal mesh to be produced are knitted simultaneously on one needle bed each, so the two layers are not produced one after the other.

In the context of the present invention, "two-layer noble metal meshes" are understood to mean those noble metal meshes which comprise two layers, wherein the layers can generally be interconnected via one or more of their respective abutting edges or can also be unconnected at their abutting edges. The two layers lie on top of each other, i.e., they overlap at least partially in the region of their surface extent. Noble metal meshes which, as in the case of the present invention, are interconnected on one side via the abutting edges of the two layers are also referred to as two-layer noble metal meshes. A single-layer noble metal mesh can be obtained by folding open along the common abutting edge.

The first and the second layer of the two-layer noble metal mesh each comprise at least two abutting edges, i.e., each layer comprises an abutting edge on one side and another abutting edge on the other side. The sides of the noble metal layers are to be understood in relation to the position of the abutting edges on the two needle beds perpendicular to the knitting direction.

Depending on the shape of the relevant layer, the abutting edges of a layer may not intersect, as in the case of a rectangular layer, or they may intersect, as in the case of a semicircular layer, for example. The abutting edges are formed during the knitting process in the knitting direction from bottom to top. The two noble metal layers can also comprise an upper and/or lower edge or abutting edge; the presence of these edges depends on the shape of the relevant layer. A rectangular layer, for example, comprises a lower and an upper edge or abutting edge in addition to the two lateral abutting edges, whereas a semicircular layer does not comprise any further edges or abutting edges.

The lower edges or abutting edges are those edges or abutting edges that are formed first in the knitting direction, i.e., are located at the bottom of the knitted fabric. Accordingly, the upper edges or abutting edges are those that are formed later in the knitting direction. The reference for the height of the knitted fabric, which will be referred to in the following, is the bottom knitting row of the knitted fabric. Even if the knitting of a layer is started in different knitting rows, the height of the whole knitted fabric remains the same; in other words, the layers of the knitted fabric can comprise a different number of knitting rows at different heights.

The first and the second layer of the two-layer noble metal mesh are at least partially connected at their two respective abutting edges by at least one connecting knit stitch. This means that the two layers are interconnected via stitches formed from at least one noble-metal-containing wire. These connections create a knitted fabric that is at least partially tubular.

The two noble metal mesh layers are connected on both sides at least via parts of their respective abutting edges, and these partial connections can be made at the same height, i.e., in the same knitting row or rows, or at different heights. The partial connections can be made over the same length on both sides, i.e., over the same number of knitting rows. However, the partial connections can also be made over a different length on both sides.

In a preferred embodiment, the partial connections are made at least partially in the same knitting rows. In such an embodiment, knitting is therefore done at least partially in the round, i.e., circular-knitted; in other words, a ring-like structure is created via these knitting rows. It has been shown that knitting such an at least partially ring-like structure can have a positive influence on the stability of the knitting process.

The first and the second layer of the two-layer noble metal mesh can preferably be knitted from a noble-metal-containing wire or noble-metal-containing wires of the same composition. However, the two layers can also be knitted from a noble-metal-containing wire or noble-metal-containing wires of different compositions.

Noble-metal-containing wire having the same or different diameters can be used to knit the first and second layers of the two-layer noble metal mesh. It has been proven favorable for the first and the second layer of the two-layer noble metal mesh to be knitted from a noble-metal-containing wire or noble-metal-containing wires of the same diameter.

The first and the second layer of the two-layer noble metal mesh can be knitted in the same or different knitting patterns. Different knitting patterns can result from different stitch lengths, floats or tucks, for example. In preferred embodiments, the first and the second layer of the two-layer noble metal mesh are knitted in the same knitting pattern.

The first and the second layer of the two-layer noble metal mesh can have the same or different lengths in the knitting direction and/or the same or different widths perpendicular to the knitting direction. The first and the second layer of the noble metal mesh preferably have the same length and the same width.

The first and the second layer of the two-layer noble metal mesh can have the same shape or different shapes. The first and the second layer of the two-layer noble metal mesh particularly preferably have the same shape. It may be advantageous for the first and the second layer of the two-layer noble metal mesh to have the shape of a semicircle which may be flattened on one side. It can be particularly advantageous for these two semicircles to have the same width and the same length.

In preferred embodiments, the first and the second layer of the two-layer noble metal mesh are congruent; in other words, the two layers can have the same length, the same width and the same shape.

It may be advantageous for a support thread to be additionally used in the method according to the invention. Such support threads can be used to stabilize the resulting knitted fabric or the method, for example to prevent the noble metal-containing wire from tearing off. Suitable support threads can be selected by routine testing and taking into account the final intended use of the two-layer noble metal mesh and any additional steps in the manufacturing process. Preferred support threads can be removed after the two-layer noble metal mesh has been produced, for example by dissolving them in acidic or basic media, cutting them off, melting them or flaming them. Such support threads can be of a natural or synthetic organic nature or inorganic nature. Examples of suitable materials are polyamides, polyesters, cellulose fibers, cotton, acrylic-styrene polymers, nylon, PVA and other vinyl polymers, alginate, copper, silver, aluminum, or even metals having a low melting point such as tin alloys and lead alloys.

The method may comprise simultaneously knitting a support mesh using the support thread. In other words, the support mesh can be knitted at the same time as the two layers of the two-layer noble metal mesh to be produced, so the two layers and the support mesh are not produced one after the other. It may be preferable to knit the support mesh at least partially on the first and second needle beds.

The term "support mesh" refers to the regions of the knitted fabric that are at least partially knitted using the support thread. The knitted fabric comprises all knitting rows that are formed during the method. The knitted fabric comprises at least the first and the second layer of the two-layer noble metal mesh. However, the knitted fabric may also comprise further parts or regions, such as a support mesh.

The support mesh may also comprise additional threads or wires.

The support thread can be knitted in parallel with the at least one noble-metal-containing wire, i.e., stitches comprising noble-metal-containing wire and support thread can be formed during knitting. In these cases, the relevant part of the resulting knitted fabric contains both noble metal and the material of the support thread. In other embodiments, the support thread can also be used for parts or regions of the knitted fabric that do not contain noble-metal-containing wire, i.e., in these cases, the resulting knitted fabric contains parts with and parts without noble-metal-containing wire. These embodiments can also be combined with one another.

Accordingly, the support mesh can comprise a plurality of regions. For example, the support mesh can also comprise knitting rows in which no noble-metal-containing wire is used, i.e., in which only the support thread is used for knitting. In other words, the knitted fabric can comprise regions that do not contain noble-metal-containing wire. The knitted fabric can also comprise knitting rows that are only formed by regions of the support mesh.

The shape of the support mesh is not further restricted. However, it has proven to be advantageous that the shape of the support mesh is designed in such a way that the overall shape of the knitted fabric is rectangular. In other words, the support mesh can complement the layers of the noble metal mesh in such a way that the shape of the knitted fabric, comprising the noble metal layer or noble metal layers and support mesh, is rectangular overall.

It may be preferable for the support mesh to be knitted in two layers in the regions that do not contain noble-metal-containing wire. In other words, the support mesh in these knitting rows cannot be knitted with connecting stitches between the first and second needle bed. These two layers can be connected at the edge stitches via connecting knit stitches; it can therefore be advantageous for the support mesh to have a tubular structure in these regions. It may also be preferable for the support mesh to be knitted in one layer in the regions that do not comprise noble-metal-containing wire.

In preferred embodiments, the support mesh comprises single-layer knitted regions and two-layer knitted regions that do not comprise noble-metal-containing wire.

It may be advantageous for the support mesh to surround the two layers of the two-layer noble metal mesh on more than one side. In preferred embodiments, the support mesh surrounds at least 50% of the two layers of the two-layer noble metal mesh. This means that at least 50%, preferably at least 60%, even more preferably at least 80%, of the periphery of the two layers of the two-layer noble metal mesh is surrounded by the support mesh. It can be particularly preferable for the support mesh to completely surround the two layers of the two-layer noble metal mesh.

Preferably, all regions of the support mesh can be knitted from support threads of the same composition. However, different regions can also be knitted from support threads of different compositions. Different regions of the support mesh can be knitted in the same or different knitting patterns.

It may be advantageous to remove the support mesh in an additional method step, for example to decompose, dissolve, melt, flame or cut it off.

The method according to the invention may comprise further steps.

The method may comprise providing at least one further wire or thread. Suitable further wires or threads can be selected depending on the intended use and/or function in the manufacturing process or for the subsequent application of the noble metal mesh. For example, the further wire can be a wire made of a non-noble metal that is suitable for stabilizing the noble metal mesh when used in the reactor. For example, it can be a steel or stainless steel wire. In these cases, the method comprises simultaneously knitting regions of the knitted fabric using the at least one further wire or thread. In this case, the knitted fabric can comprise parts or regions that contain only the further wire or thread, or parts or regions that contain both the further wire or thread and the noble-metal-containing wire and/or a support thread.

In a further step, the connecting stitch or the connecting stitches between the first and second layers of the two-layer noble metal mesh can be removed on one side; in other words, the two layers are separated on one side. This creates a noble metal mesh that is at least partially connected on only one side, i.e., via only one abutting edge of the two layers. In other words, a single-layer noble metal mesh can be produced in this way.

The invention is explained in more detail below with reference to drawings and an example. However, it is not limited to these embodiments.

Figure 2:
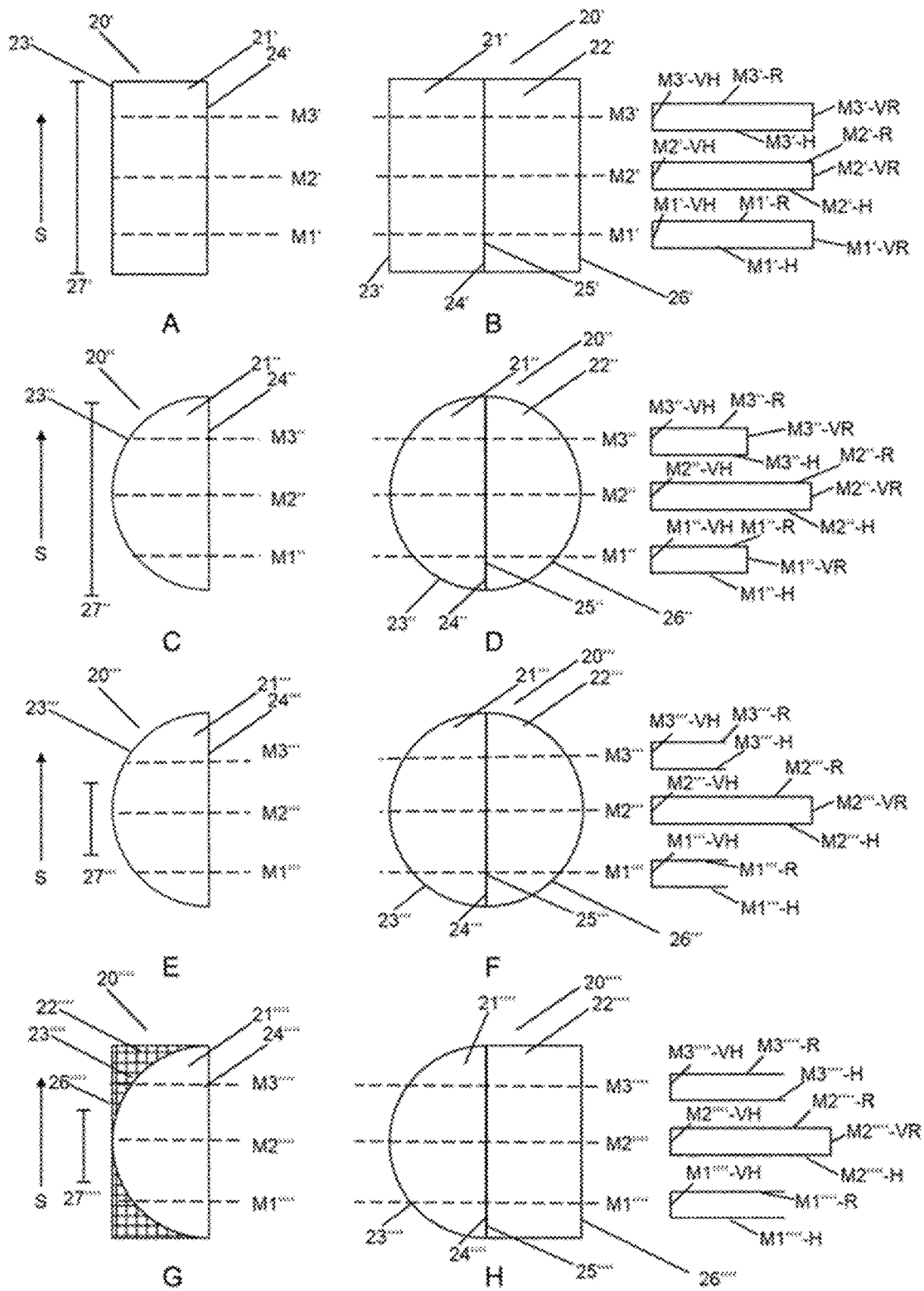

FIG. 1 is a schematic view of a flow reactor for the heterogeneous catalytic combustion of ammonia, FIG. 2 shows embodiments of noble metal meshes that can be produced using the method according to the invention.

FIG. 1 is a schematic view of a vertically-positioned flow reactor 1 for the heterogeneous catalytic combustion of ammonia. The catalyst system 2 forms the actual reaction zone of the flow reactor 1. It comprises catalyst packing 3 and downstream catchment meshes 4. The catalyst packing 3 comprises a plurality of catalyst meshes 6 arranged one behind the other in the flow direction 5 of the fresh gas.

Typically, the catalyst meshes 6 are knitted meshes that are produced, for example, from various platinum-rhodium alloys by knitting wire having a diameter of 76 μm. Catchment meshes 4 may also be provided.

FIG. 2 schematically shows embodiments of noble metal meshes that can be produced using the method according to the invention.

FIGS. 2 A and B show a two-layer noble metal mesh 20' consisting of two rectangular layers 21' and 22' which are connected on both sides and over the entire length of the noble metal mesh 20' along the knitting direction S. In the frontal view in FIG. 2 A, only the first layer 21' is visible. FIG. 2 B shows a view of the noble metal mesh 20' opened along the abutting edge 24' of the first layer 21'. The "opening" is to be understood virtually at this point and serves to provide a better understanding of the invention. In the event that, after the production of the two-layer noble metal mesh 20', a further method step is carried out in which the two abutting edges 23' and 26' are separated from one another, the corresponding single-layer noble metal mesh would have the shape shown in FIG. 2 B. Also shown are the position of exemplary knitting rows M1', M2', M3' along the knitting direction S at different heights of the noble metal mesh 20', the positions of which in the noble metal mesh 20' are indicated by dashed lines. The section 27' of the length of the noble metal mesh shows the region or the knitting rows over which the two layers are connected to one another at their abutting edges (23' and 24' of the first layer 21' and 25' and 26' of the second layer 22'). The noble metal mesh 20' has a tubular structure that is open at the bottom and top ends. In the case of the embodiment of a noble metal mesh according to FIGS. 2 A and B, one right side row (M1'-H, M2'-H, M3'-H) is knitted on the first needle bed and one wrong side row (M1'-R, M2'-R, M3'-R) is knitted on the second needle bed. On both sides, the right side and wrong side rows (M1'-H-M1'-R, M2'-H-M2'-R, M3'-H-M3'-R) are connected using connecting stitches (M1'-VH, M2'-VH, M3'-VH, M1'-VR M2'-VR, M3'-VR). The two sides correspond to the respective abutting edges of the two layers (21', 22') of the noble metal mesh 20'.

FIG. 2 C shows the front view of a noble metal mesh 20" which is formed from two semicircular layers 21" and 22" (the second layer 22" is not visible in the perspective in FIG. 2 C). FIG. 2 D again shows a perspective of the noble metal mesh 20" virtually unfolded along the abutting edge 24" and three exemplary knitting rows M1", M2", M3" at different heights along the knitting direction S. Both the outward and return rows of the lower and upper knitting rows M1"-H, M3"-H and M1"-R, M3"-R are shorter, i.e., comprise fewer stitches, than those of the middle knitting row (M2"-H, M2"-R). The number of stitches per knitting row can therefore be used to determine the shape of the noble metal mesh, or the shape of the layers. The layers 21" and 22" are connected over the entire length 27" on both sides. When separating the connection of the two layers 21" and 22" of the noble metal mesh 20" between the abutting edges 23' and 26', a noble metal mesh having a round cross-section can be obtained.

FIGS. 2 E and F show a noble metal mesh 20''' formed from two semicircular layers 21''' and 22''' which are connected to one another on both sides only over parts of the length of the noble metal mesh 27'''. Accordingly, the outward and return rows of the lower and upper knitting rows M1'''-H, M3'''-H and M1'''-R, M3'''-R are only connected to one another on one side (M1'''-VH, M3'''-VH). The abutting edges 23''' and 25''' can be connected to one another over their entire length.

FIGS. 2 G and H show a noble metal mesh 20'''' formed from a first semicircular layer 21'''' and a second rectangular layer 22'''' (shown hatched in FIG. 2 G). The two layers 21'''' and 22'''' are only connected to one another over parts of the length 27''''.

EXAMPLE AND COMPARATIVE EXAMPLE

On a flat-bed knitting machine comprising two needle beds, a rectangular layer (100 cm wide, 200 cm long) was knitted on each needle bed using a PtRh5 wire (76 μm diameter). In the comparative example, the two layers were connected to one another by suitable thread guidance only on one side, and in the example according to the invention on both sides (according to FIG. 2 A and FIG. 2 B). In the latter case, one connecting side was unpicked after the knitting process. In both cases, a noble metal mesh with a width of 200 cm and a length of 200 cm was obtained.

Despite the additional work step for the product produced according to the invention, the method proved to be faster and more reliable. During the knitting process of the comparative example, wire tears occurred repeatedly, resulting in production being interrupted. In addition to the necessary repairs to the wire, the knitted fabric also had an uneven, distorted structure. Such irregularities in the knitted fabric are potential mechanical weak points that have a negative effect when the mesh is used in the reactor.

DEFINITION OF THE REFERENCE SIGNS USED

| | |
|---|---|
| 1 | Flow reactor |
| 2 | Catalyst system |
| 3 | Catalyst packing |
| 4 | Catchment meshes |
| 5 | Flow direction |
| 6 | Single-layer catalyst meshes |
| 20', 20'', 20''', 20'''' | Knitted noble metal mesh |
| 21', 21'', 21''', 21'''' | First layer of a noble metal mesh |
| 22', 22'', 22''', 22'''' | Second layer of a noble metal mesh |
| 23', 23'', 23''', 23'''' | Abutting edges of the noble metal mesh layers |
| 24', 24'', 24''', 24'''' | |
| 25', 25'', 25''', 25'''' | |
| 26', 26'', 26''', 26'''' | |
| 27', 27'', 27''', 27'''' | Regions of the noble metal mesh that are connected on both sides |
| M1', M1'', M1''', M1'''' | Lower knitting row |
| M2', M2'', M2''', M2'''' | Middle knitting row |
| M3', M3'', M3''', M3'''' | Upper knitting row |
| M1'-H, M1''-H, M1'''-H, M1''''-H | Right side row |
| M2'-H, M2''-H, M2'''-H, M2''''-H | |
| M3'-H, M3''-H, M3'''-H, M3''''-H | |
| M1'-R, M1''-R, M1'''-R, M1''''-R | Wrong side row |
| M2'-R, M2''-R, M2'''-R, M2''''-R | |
| M3'-R, M3''-R, M3'''-R, M3''''-R | |
| M1'-HR, M1''-HR, M1'''-HR, M1''''-HR | Connecting stitches |
| M2'-HR, M2''-HR, M2'''-HR, M2''''-HR | |
| M3'-HR, M3''-HR, M3'''-HR, M3''''-HR | |
| M1'-VR, M1''-VR, M1'''-VR, M1''''-VR | |
| M2'-VR, M2''-VR, M2'''-VR, M2''''-VR | |
| M3'-VR, M3''-VR, M3'''-VR, M3''''-VR | |
| S | Knitting direction |

The invention claimed is:

1. A method for producing a two-layer noble metal mesh on a flat-bed knitting machine, the flat-bed knitting machine comprising a first and a second needle bed, the method comprising the steps of:
   providing at least one noble-metal-containing wire, and knitting the noble metal mesh,
   the first layer of the noble metal mesh being knitted on the first needle bed and the second layer of the noble metal mesh being knitted on the second needle bed at the same time,
   the two layers each comprising at least two abutting edges, wherein the first and the second layer of the noble metal mesh are connected, at least in part, at their two respective abutting edges thereof, by at least one connecting knit stitch.

2. The method according to claim 1, wherein the connection is created at least in part in the same knitting rows.

3. The method according to claim 1, wherein the at least one noble-metal-containing wire consists of platinum, a platinum alloy, palladium, or a palladium alloy.

4. The method according to claim 1, wherein the first and the second layer of the noble metal mesh are knitted from a noble-metal-containing wire or noble-metal-containing wires of the same composition.

5. The method according to claim 1, wherein the first and the second layer of the two-layer noble metal mesh are knitted from a noble-metal-containing wire or noble-metal-containing wires of the same diameter.

6. The method according to claim 1, wherein the first and the second layer of the two-layer noble metal mesh are knitted in the same knitting pattern.

7. The method according to claim 1, wherein the first and the second layer of the two-layer noble metal mesh are congruent.

8. The method according to claim 1, wherein the method comprises simultaneously knitting a support mesh using a support thread.

9. The method according to claim 8, wherein the support mesh is removed in an additional method step.

10. The method according to claim 1, wherein, in a further step, the connecting stitch or the connecting stitches between the first and second layers of the two-layer noble metal mesh are removed on one side.

* * * * *